United States Patent [19]

Lohmann

[11] Patent Number: 5,417,142
[45] Date of Patent: May 23, 1995

[54] HYDRAULIC AMPLIFIER

[75] Inventor: Craig W. Lohmann, Brimfield, Ill.

[73] Assignee: Caterpillar Inc., Peoria, Ill.

[21] Appl. No.: 245,771

[22] Filed: May 18, 1994

Related U.S. Application Data

[63] Continuation of Ser. No. 993,471, Dec. 18, 1992, abandoned.

[51] Int. Cl.6 .................... F15B 13/044; F16K 31/12
[52] U.S. Cl. ................... 91/459; 137/625.65; 251/57; 251/129.06
[58] Field of Search ............ 60/533, 325; 91/418, 91/459, 462, 465, 466; 251/57, 129.06; 137/625.65

[56] References Cited

U.S. PATENT DOCUMENTS

| | | | |
|---|---|---|---|
| 3,501,099 | 3/1970 | Benson | 239/585 |
| 3,648,967 | 3/1972 | O'Neill et al. | 251/57 |
| 4,085,920 | 4/1978 | Waudoit | 251/57 |
| 4,684,104 | 8/1987 | Micard | 251/129.05 |
| 4,750,706 | 6/1988 | Schlagmuller | 251/57 |
| 4,762,300 | 8/1988 | Inagaki et al. | 251/129.06 |
| 4,782,807 | 11/1988 | Takahashi | 123/506 |
| 4,784,102 | 11/1988 | Igashira et al. | 123/447 |
| 4,982,758 | 1/1991 | Schlachter | 251/57 X |
| 5,117,790 | 6/1992 | Clarke et al. | 123/321 |
| 5,130,598 | 7/1992 | Verheyen et al. | 310/316 |
| 5,165,653 | 11/1992 | Weber | 251/57 |
| 5,201,296 | 4/1993 | Wunning et al. | 123/479 |
| 5,203,830 | 4/1993 | Faletti et al. | 123/568 |
| 5,205,152 | 4/1993 | Clarke et al. | 73/9 |
| 5,216,987 | 6/1993 | Clarke | 123/90.11 |
| 5,226,401 | 7/1993 | Clarke et al. | 123/571 |
| 5,237,968 | 8/1993 | Miller et al. | 123/90.11 |
| 5,237,976 | 8/1993 | Lawrence et al. | 123/508 |
| 5,251,590 | 10/1993 | Faletti et al. | 123/179.21 |
| 5,255,650 | 10/1993 | Faletti et al. | 123/322 |
| 5,271,229 | 12/1993 | Clarke et al. | 60/605.1 |

FOREIGN PATENT DOCUMENTS

| | | | |
|---|---|---|---|
| 1400397 | 7/1975 | European Pat. Off. | |
| 1569638 | 6/1980 | European Pat. Off. | |
| 0227078 | 11/1985 | Japan | 251/129.06 |
| 0228175 | 10/1986 | Japan | 251/129.06 |
| 0266886 | 11/1986 | Japan | 251/129.06 |
| 0184284 | 8/1987 | Japan | 251/129.06 |
| 0251580 | 11/1987 | Japan | 251/129.06 |

Primary Examiner—Edward K. Look
Assistant Examiner—Hoang Nguyen
Attorney, Agent, or Firm—Frank L. Hart

[57] ABSTRACT

A system for hydraulically amplifying the deflection of a deflectable, resilient member into a greater displacement of a subject member. The system includes a deflectable resilient member, a fluid filled space in the pathway of and into which the deflectable, resilient member is deflectable, a subject member adjacent the fluid filled space, and an electroexpansive module for deflecting the deflectable, resilient member into the fluid filled space, wherein when the deflectable, resilient member is deflected into the fluid filled space the hydraulic pressure of the fluid in the space increases and acts against the subject member displacing the subject member a distance greater than the deflection of the deflectable, resilient member.

6 Claims, 2 Drawing Sheets

HYDRAULIC AMPLIFIER

This is a file wrapper continuation of application Ser. No. 07/993,471, filed Dec. 18, 1992, now abandoned.

TECHNICAL FIELD

The present invention relates generally to a system for hydraulically amplifying the deflection of a deflectable, resilient member into a greater displacement of a subject member, and more particularly to a system of using fluid to hydraulically amplify the relatively short longitudinal expansion of an electroexpansive module into a greater longitudinal displacement of a spool valve.

BACKGROUND ART

Solid state motors such as piezoelectric motors have some unique properties. They may be energized proportionately; they may be held in energized condition without significant consumption of energy; they may be operated without significant wear or deterioration; they develop high forces; they respond to energization extremely fast; and, their load/displacement characteristics closely match the requirements of typical fast-response mechanisms.

However, the solid state motor has a relatively small displacement (i.e. elongation). Thus, many applications of the solid state motor require that its displacement be amplified either mechanically or hydraulically to produce a greater displacement of the member which is the subject of the actuation.

A common hydraulic amplifier is a master/slave piston arrangement, such as shown in U.S. Pat. No. 3,648,967, which issued on Mar. 14, 1972. This common arrangement includes a solid state motor in contact with a relatively large diameter piston, which is separated from the relatively smaller diameter piston, which is the ultimate subject of the actuation, by a fluid filled space. The relatively small displacement of the larger piston results in a greater displacement of the smaller piston because the displacement of the smaller piston is equal to the displacement of the larger piston multiplied by the quotient obtained by dividing the surface area of the larger piston in contact with the fluid by the surface area of the smaller piston in contact with the fluid.

One problem with such a master/slave piston arrangement is that it is extremely difficult to prevent fluid from leaking from the fluid filled space into the solid state motor cavity. The present invention is a low cost means for providing amplification while solving the leakage problem. In place of the larger piston has been substituted a deflectable, resilient member.

Therefore, it is an object of the present invention to provide a hydraulic amplifier system including a deflectable, resilient member, a fluid filled space in the pathway of and into which said deflectable, resilient member is deflectable, a subject member adjacent said fluid filled space, and a means for deflecting said deflectable, resilient member into said fluid filled space, wherein deflection of the deflectable, resilient member into the fluid space causes the hydraulic pressure of the fluid to increase which resultingly displaces the subject member from its first position.

Additional objects of the present invention are that the means for deflecting be an electroexpansive module, such as a piezoelectric motor, that the deflectable, resilient member be made of metal, such as SAE 1095 spring steel, that the fluid space be closed (i.e., the fluid does not drain out of the fluid space when the deflectable, resilient member deflects into the fluid space), and that the subject member be a spool valve spring biased to its first position.

DISCLOSURE OF THE INVENTION

The invention relates to a system for hydraulically amplifying the deflection of a deflectable, resilient member into a greater displacement of a subject member. The system includes a deflectable, resilient member, a fluid filled space in the pathway of and into which the deflectable, resilient member is deflectable, a subject member adjacent the fluid filled space, and a means for deflecting the deflectable, resilient member into the fluid filled space, wherein when the deflectable, resilient member is deflected into the fluid filled space the hydraulic pressure of the fluid in the space increases and acts upon the subject member displacing the subject member a distance that is greater than the deflection of the deflectable, resilient member. Preferably the means for deflecting is an electroexpansive module such as a piezoelectric motor. Also preferably, the deflectable, resilient member is a disc of SAE 1095 spring steel which is glued to the piezoelectric motor. Also preferably, the surface area of the deflectable, resilient member in contact with the fluid of the fluid filled space is greater than the surface area of the subject member in contact with the fluid of the fluid filled space.

BEST MODE FOR CARRYING OUT THE INVENTION

Figure 1:
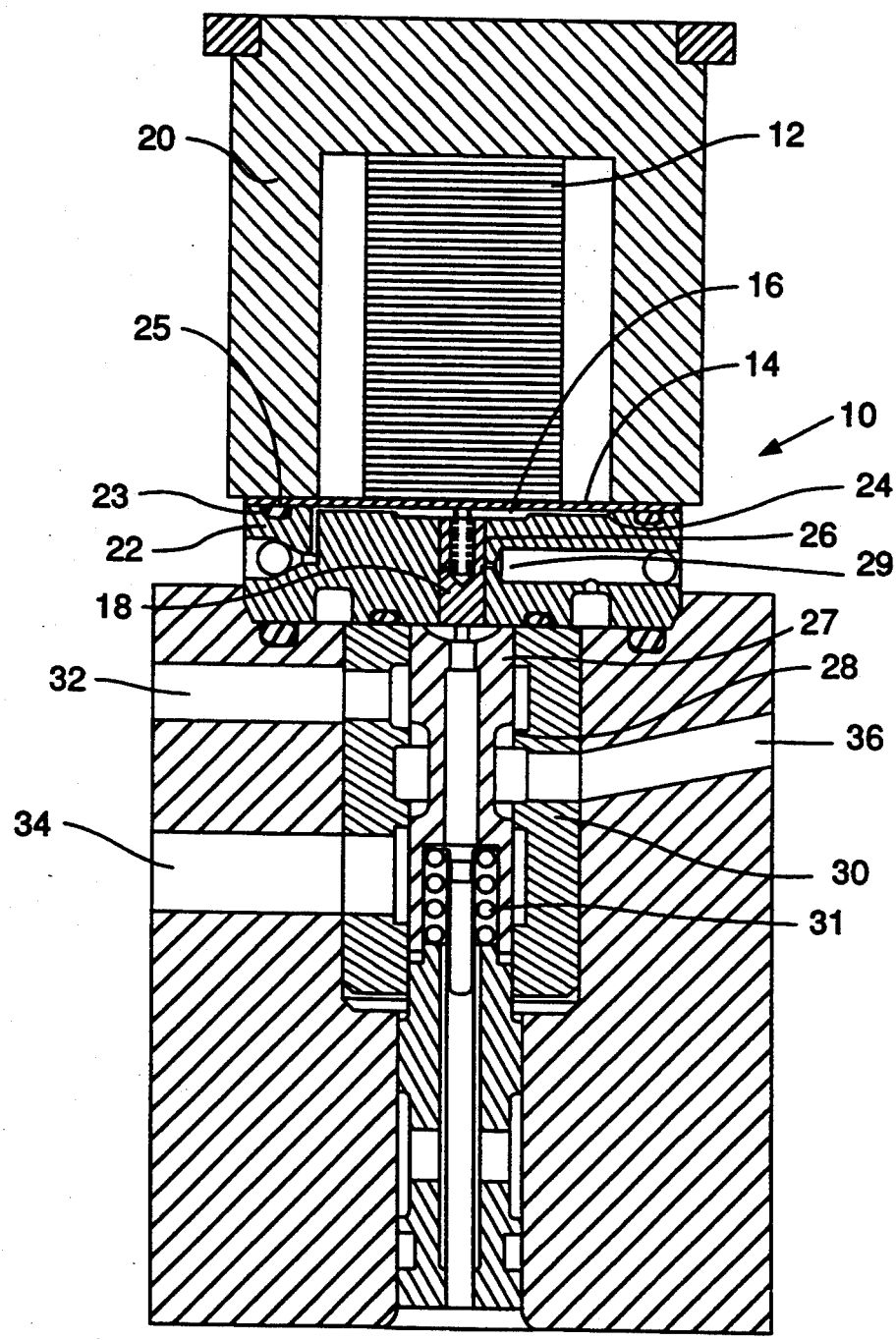
FIG. 1 is a diagrammatic, cross-sectional, elevational view of an amplifier system of the present invention in its non-energized condition.

FIG. 1 illustrates a hydraulic amplifier system 10 for amplifying the displacement of an electroexpansive module 12. The system 10 includes the electroexpansive module 12, a deflectable, resilient member 14 in the pathway of the electroexpansive module 12, a fluid filled space 16 in the pathway of the deflectable, resilient member 14, and a subject member 18 adjacent the fluid filled space 16. The preferred cross-section of all members of the system 10 is circular, although other cross-sections may work as well or better.

The electroexpansive module 12 is preferably a solid state motor and more preferably a piezoelectric motor, which motor is well known in the art. The electroexpansive module 12 is housed within a first housing 20.

Adjacent the module 12 and the first housing 20 is the deflectable, resilient member 14. The deflectable, resilient member 14 may be any shape or material that can be deflected under force and then return substantially to its original position and shape after the force is relieved. The deflectable, resilient member may be made of metal, plastic, rubber, or any other material having the stated characteristics. A preferred deflectable, resilient member is a flat disc of SAE 1095 spring steel. In a preferred embodiment, the deflectable, resilient member is affixed to the module 12, two preferred means of affixation being Loctite 324 glue or laser welding. The deflectable, resilient member is held between the first housing 20 and a second housing 22. A groove 23 in the second housing 20 holds an O-ring seal 25 which prevents fluid from leaking from the fluid filled space 16.

The second housing 22 has a counterbore 24 and a throughbore 26. Within the bore 26 is the subject member 18, in the preferred embodiment a small piston. The term "subject member" simply identifies the member as the first recipient or first beneficiary of the amplification. The subject member may itself act against another member, such as the on-off valve 27. In use, the space 16 formed by the counterbore 24 and the deflectable, resilient member 14 is filled with fluid, preferably oil, thus the notation "fluid filled space". The oil is maintained at a pressure of 185 psi so as to keep a load on the deflectable, resilient member and resultingly the electroexpansive module 12 so that when the electroexpansive module 12 is deenergized, the load will help return the electroexpansive module 12 to its at-rest position. The oil pressure is also selected to keep the subject member 18 from "floating" beyond its first position, which is shown in FIG. 1.

Preferably, the surface area of the deflectable, resilient member 14 in contact with the fluid of the fluid filled space is greater than the surface area of the subject member 18 in contact with the fluid of the fluid filled space. In this way, the relatively small displacement of the electroexpansive module 12 and deflection of the deflectable, resilient member results in a greater displacement of the subject member 18, according to the formula set forth earlier.

In communication with the fluid filled space 16 is a pressure equalization line 29, as shown and described in U.S. Pat. No. 5,165,653 which issued to Weber on Nov. 24, 1992.

Adjacent the subject member 18 is an "on-off" valve 27, preferably a spool valve of conventional design and function. The "on-off" valve is housed in a bore 28 in a third housing 30. The on-off valve is biased towards its first position, as shown in FIG. 1, preferably by a spring 31. A low pressure fluid line 32 and a high pressure fluid line 34 communicate with the bore 28. A trunk line 36 extends from the bore 28.

Industrial Applicability

Figure 2:
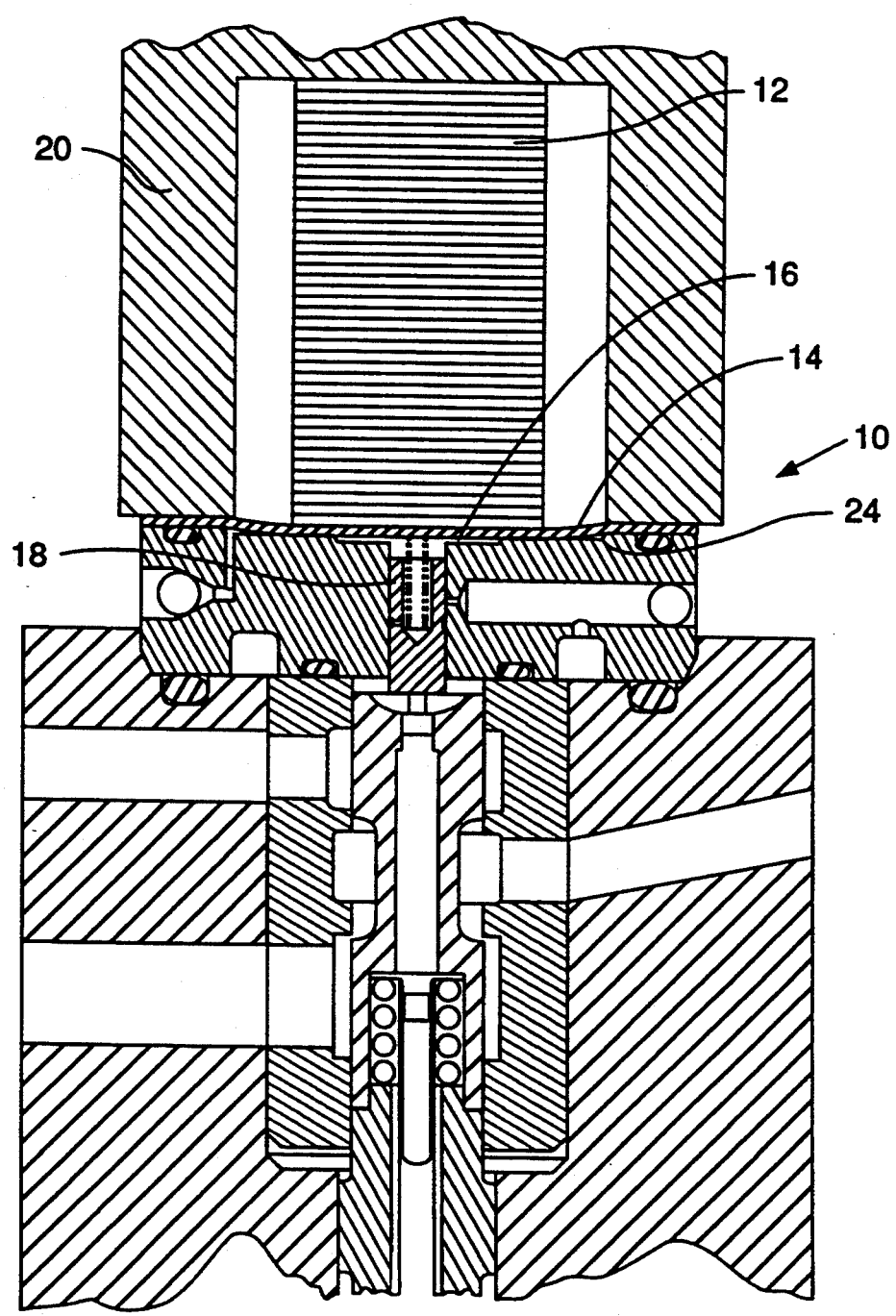
FIG. 2 is a diagrammatic, cross-sectional, elevational view of an amplifier system of the present invention in its energized condition.

Electrical current is provided to the electroexpansive module causing it to expand longitudinally. The force of the module as it expands against the deflectable, resilient member 14 deflects the deflectable, resilient member 14 into the fluid filled space 16. As the deflectable, resilient member 14 deflects into the space 16, the fluid is compressed thereby increasing in hydraulic pressure. The fluid acts against the subject member 18 which acts against the "on-off" valve 27, displacing them both against the biasing force away from their first position shown in FIG. 1, to a second position, such as shown in FIG. 2. As the "on-off" valve 27 is displaced, communication of the low pressure fluid line 32 with the trunk line 36 is closed and communication of the high pressure fluid line 34 with the trunk line 36 is opened. High pressure fluid flows into the trunk line 36 against the plunger of an engine valve (not shown) to open the engine valve, such application being well known in the art.

When the electroexpansive module 12 is deenergized, the system returns to its neutral state shown in FIG. 1 under the biasing force of the deflectable, resilient member 14 and the spring 31.

Other aspects, objects and advantages of this invention can be obtained from a study of the drawings, the disclosure, and the appended claims.

I claim:

1. A hydraulic amplifier system comprising:
   a first housing;
   a second housing having a bore;
   a deflectable, resilient, and imperforate member sealedly held between the first and second housings;
   a fluid filled space in the pathway of and into which said deflectable member is deflectable;
   a displaceable subject member positioned in the bore of the second housing adjacent said fluid filled space, said subject member, deflectable member, and second housing forming said fluid filled space; and
   means for deflecting said deflectable member into said fluid filled space, said means for deflecting including an electroexpansive module housed within the first housing, said deflectable member sealing the electroexpansive module from the fluid filled space and being engaged by said deflectable member;
   deflection of said deflectable member into said space causing the hydraulic pressure of said fluid in said space to increase, said increased pressure acting against said subject member causing said subject member to displace.

2. The amplifier system as claimed in claim 1, said deflectable, resilient member being comprised of metal.

3. The amplifier system as claimed in claim 1, said means for deflecting including an electroexpansive module.

4. The amplifier system as claimed in claim 1, said deflectable, resilient member being affixed to said deflecting means.

5. The amplifier system as claimed in claim 1, the surface area of said deflectable, resilient member in contact with said fluid of said fluid filled space being greater than the surface area of said subject member in contact with said fluid of said fluid filled space.

6. A hydraulic amplifier system adapted for selectively opening an engine valve, comprising:
   a first housing;
   a second housing having a bore;
   a deflectable, resilient, and imperforate member sealedly held between the first and second housings;
   a closed fluid filled space in the pathway of and into which said deflectable member is deflectable;
   a displaceable piston positioned in the bore of the second housing adjacent said fluid filled space, said piston, deflectable member, and second housing forming said fluid filled space, wherein the surface area of said deflectable member in contact with said fluid of said fluid filled space is greater than the surface area of said piston in contact with said fluid of said fluid filled space; and
   means for deflecting said deflectable member into said fluid filled space, said deflecting means including an electroexpansive module housed within the first housing, said deflectable member sealing the electroexpansive module from the fluid filled space and being engaged by said deflectable member;
   deflection of said deflectable member into said fluid filled space causing the hydraulic pressure of said fluid in said space to increase, said increased pressure acting against said piston causing said piston to displace.

* * * * *